(12) United States Patent
Zhao et al.

(10) Patent No.: US 12,292,819 B2
(45) Date of Patent: May 6, 2025

(54) COMPATIBILITY TESTING OF WEB-BASED SOFTWARE APPLICATIONS

(71) Applicant: International Business Machines Corporation, Armonk, NY (US)

(72) Inventors: Hong Liang Zhao, Beijing (CN); Qi Li, Beijing (CN); Yan Hui Wang, Beijing (CN); Jia Lei Rui, Li Yang (CN); Qun Wei, Beijing (CN); Yun Juan Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 100 days.

(21) Appl. No.: 17/933,887

(22) Filed: Sep. 21, 2022

(65) Prior Publication Data
US 2024/0095155 A1    Mar. 21, 2024

(51) Int. Cl.
    *G06F 11/3668*    (2025.01)
(52) U.S. Cl.
    CPC ...... *G06F 11/3688* (2013.01); *G06F 11/3684* (2013.01)
(58) Field of Classification Search
    CPC ............ G06F 11/3668; G06F 11/3688; G06F 11/3676; G06F 11/368; G06F 11/3684; G06F 11/3692; G06F 11/367
    See application file for complete search history.

(56) References Cited

U.S. PATENT DOCUMENTS

| | | | |
|---|---|---|---|
| 8,504,991 B2 | 8/2013 | Huang et al. | |
| 9,003,423 B1 | 4/2015 | Rodriguez et al. | |
| 9,208,054 B2 * | 12/2015 | Prasad | G06F 11/3664 |
| 11,099,237 B2 * | 8/2021 | Nochilur | G06F 11/3692 |
| 11,372,746 B2 * | 6/2022 | Lin | G06F 11/323 |

(Continued)

FOREIGN PATENT DOCUMENTS

CN    105247480 A    1/2016

OTHER PUBLICATIONS

Leonardo Mariani, "Semantic matching of GUI events for test reuse: are we there yet?", Jul. 2021, ISSTA 2021: Proceedings of the 30th ACM SIGSOFT International Symposium on Software Testing and Analysis, pp. 177-190 (Year: 2021).*

(Continued)

*Primary Examiner* — Wei Y Zhen
*Assistant Examiner* — Amir Soltanzadeh
(74) *Attorney, Agent, or Firm* — CANTOR COLBURN LLP; Kelsey M. Skodje

(57) ABSTRACT

Embodiments of the invention are directed to computer-implemented methods of analyzing a web-based software application. A non-limiting example of the computer implemented method includes generating, using a processor system, a set of to-be-tested element-event pairs of the web-based software application. A set of compatibility tests is received at the processor system, where the set of compatibility tests is operable to perform compatibility testing of a corresponding set of element-event pairs. A comparison is performed between the set of to-be-tested element-event pairs and the corresponding set of element-event pairs. A compatibility testing recommendation is generated based at least in part on a result of the comparison.

25 Claims, 15 Drawing Sheets

(56) References Cited

U.S. PATENT DOCUMENTS

| | | | |
|---|---|---|---|
| 2015/0378873 A1* | 12/2015 | Prasad | G06F 11/3684 |
| | | | 714/38.1 |
| 2016/0124743 A1* | 5/2016 | Winterton | G06F 8/76 |
| | | | 717/121 |
| 2016/0259713 A1* | 9/2016 | Belur | G06F 11/368 |
| 2017/0192882 A1* | 7/2017 | Bhagavathiammal | |
| | | | G06F 11/3684 |
| 2019/0384699 A1* | 12/2019 | Arbon | G06N 3/006 |
| 2023/0418730 A1* | 12/2023 | Kumar | G06F 11/3684 |

OTHER PUBLICATIONS

Anonymous. "A method of quickly locating the Web Application Compatibility issue." IPCOM000260464D. Nov. 2019. 3 pages.

\* cited by examiner

TABLE A

CELVC 322A

|  | Test-case 1 | Test-case 2 | Test-case 3 | Test-case 4 | Test-case 5 | Test-case N .... |
|---|---|---|---|---|---|---|
| s1 | Table+deselect | Table+select | Action+Menu | Action+Menu | Action+Menu | ..... |
| s2 | Table+select | Action+Menu | Option+select | Option+select | Option+select |  |
| s3 | Action+Menu | Option+select | Button+press | Filed+input | Filed+input |  |
| s4 | Switch to | Filed+input | Filed+input | Button+press | Button+press |  |
| s5 | Table +deselect | Filed+input | Progress bar+ indicator info | Pop Message+verify | Progress bar+indicator info |  |
| s6 | Table+select | Button+press | Button+press | Filed+input | Button+press |  |
| s7 | Action+Menu | Filed+input | Pop Message+verify | Button+press | Action+Menu |  |
| s8 | Switch to | Filed+input | Button+press | Filed+input | Filed+input |  |
| s9 | Table +deselect | Button+press |  | Button+press | Button+press |  |
| s10 | Table+select | Progress bar+indicator info |  | Pop Message+verify | Pop Message+verify |  |
| s11 | Action+Menu |  |  |  |  |  |
| Total | 4 | 6 | 6 | 5 | 6 |  |

FIG. 5

$$\{C_t\} = \{C_i\}^{\{GELV\}}_{Max(K(C_i))Max(w(C_i))}$$ (Equation-1)

$C_i$: each Test-case in CELV 322A
$K(C_i)$: number (K) of element-event types in each $C_i$
$w(C_i)$: the Weight of each $C_i$
GELV: e.g., GELV 320
$C_t$: the result in sub-collection of CELV 322A

FIG. 9

TABLE B

| | Case 1 | Case 2 | Case 4 |
|---|---|---|---|
| s1 | Table+deselect | Table+select | Action+Menu |
| s2 | Table+select | Action+Menu | Option+select |
| s3 | Action+Menu | Option+select | Filed+input |
| s4 | Switch to | Filed+input | Button+press |
| s5 | Table +deselect | Filed+input | Pop Message+verify |
| s6 | Table+select | Button+press | Filed+input |
| s7 | Action+Menu | Filed+input | Button+press |
| s8 | Switch to | Filed+input | Filed+input |
| s9 | Table +deselect | Button+press | Button+press |
| s10 | Table+select | Progress bar+indicator info | Pop Message+verify |
| s11 | Action+Menu | | |
| Total | 4 | 6 | 5 |

CELVC
322B 

FIG. 10

COMPATIBILITY TESTING OF WEB-BASED SOFTWARE APPLICATIONS

BACKGROUND

The present invention relates generally to programmable computer systems, and more specifically to computer-implemented methods, computer systems and computer program products operable to test the compatibility of web-based software in order to efficiently and effectively identify and prioritize compatibility issues in web-based software applications prior to deployment.

With the rapid development of the internet technology, processor architectures, operating systems, browser kernels, and browser types, a web-based software application must be tested to ensure that the web-based application can be normally accessed in various software and hardware environments. Web-based compatibility testing is a software testing practice that ensures a web-based software application's functionality and quality meet the application's design requirements. Before delivery of a web-based software application, a variety of tests are selected and performed to identify underlying issues, such as security breaches, integration issues, functional inconsistencies, environmental challenges, traffic load issues, compatibility issues, and the like.

SUMMARY

Embodiments are directed to computer-implemented methods of analyzing a web-based software application. A non-limiting example of the computer implemented method includes generating, using a processor system, a set of to-be-tested element-event pairs of the web-based software application. A set of compatibility tests is received at the processor system, where the set of compatibility tests is operable to perform compatibility testing of a corresponding set of element-event pairs. A comparison is performed between the set of to-be-tested element-event pairs and the corresponding set of element-event pairs. A compatibility testing recommendation is generated based at least in part on a result of the comparison.

Embodiment of the invention are directed to a computer-implemented method of analyzing a web-based software application. A non-limiting example of the computer-implemented method includes scanning, using a processor system, the web-based software application to generate a set of dynamic to-be-tested element-event pairs and a set of static to-be-tested element-event pairs. A global element-event collection is formed that includes the set of dynamic to-be-tested element-event pairs and the set of static to-be-tested element-event pairs. The processor system receives a set of compatibility tests operable to perform compatibility testing of a corresponding set of element-event pairs. A comparison of the global element-event collection with the corresponding set of element-event pairs is performed, and a compatibility testing recommendation is generated based at least in part on a result of the comparison.

Embodiments of the invention are further directed to a computer systems and computer program products having substantially the same features as the above-described computer-implemented methods.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

FIG. 5 depicts a table embodying aspects of the invention;

FIG. 9 depicts an equation in embodying aspects of the invention;

FIG. 10 depicts a table embodying aspects of the invention;

Figure 1:
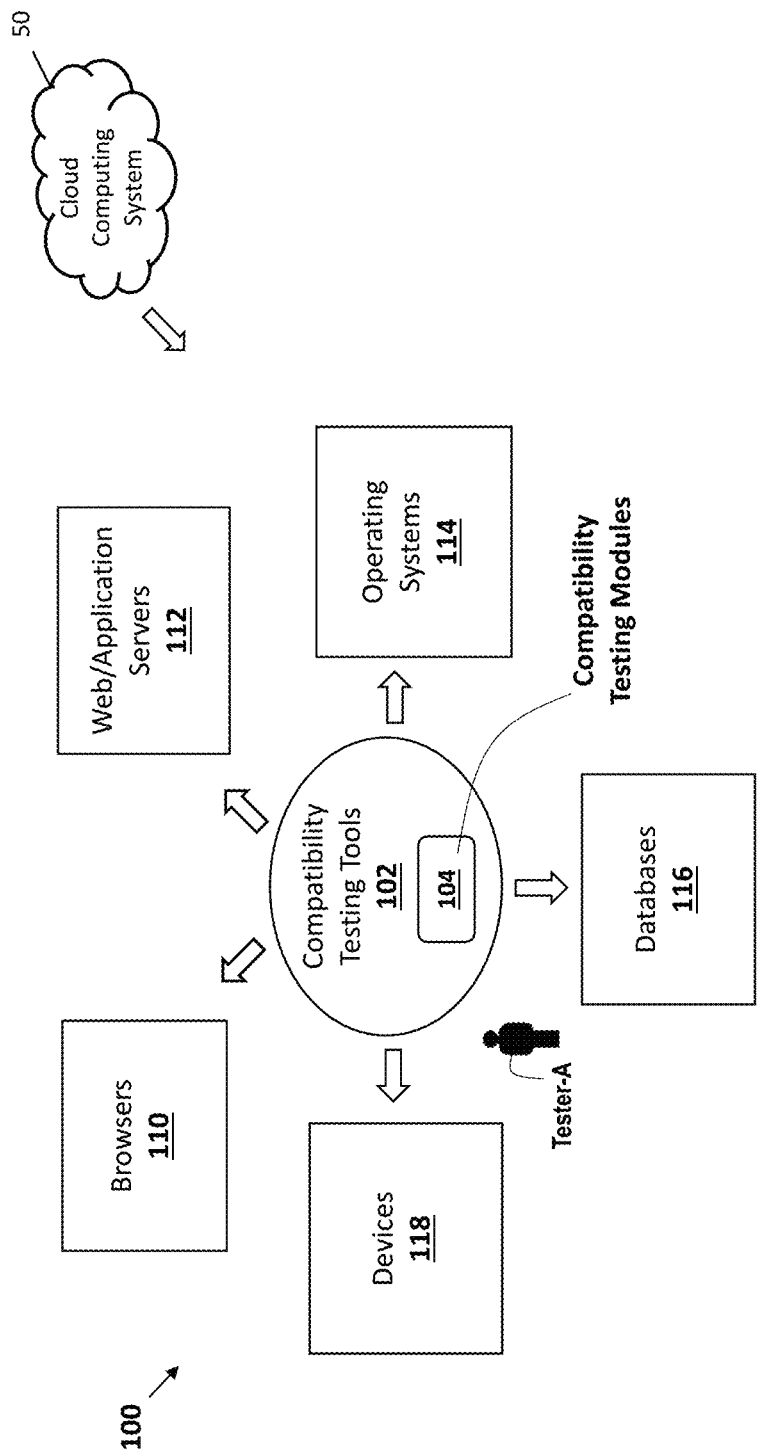
FIG. 1 depicts a block diagram illustrating a system embodying aspects of the invention.

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, include the module and achieve the stated purpose for the module.

Turning now to a more detailed description of technologies that are more specifically related to aspects of the invention, the term "software" refers to the set of electronic program instructions or data a computer processor reads in order to perform a task or operation. There are two main categories of software, namely, systems software and application software. Systems software includes the programs that are dedicated to managing the computer itself, such as the operating system, file management utilities, and the disk operating system (or DOS). Application software enables the end-user to complete tasks such as creating documents, spreadsheets, databases, and publications; doing online research; sending email; designing graphics; running businesses; and even playing games. Application software can be installed locally on the end-user's computer or mobile device, or it can be stored on the cloud and accessed by any Internet-connected device. Application software is specific to the task for which it was designed and can be as simple as a calculator application or as complex as a word processing application. A web browser is an application specifically designed to locate, retrieve, and display content found on the Internet. By clicking a hyperlink or by typing the URL of a website, a user is able to view websites formed from one or more web pages.

The phrase "software development life cycle" (SDLC) refers to the stages of a process used in developing a software product. The phrase "software release life cycle" (SRLC) refers to the stages of a process used to release and deliver the software product to its intended users. SDLC and SRLC processes ensure that software applications proceed from coding to final release in a timely and well defined manner. So-called "agile" versions of SDLC and SRLC processes have been developed to enable software to be released faster and more frequently. Agile software development is routinely applied to virtually every type and size of application software, including applications designed for less critical tasks (e.g., creating a report) and/or applications that deliver mission critical functionality or content.

The use of agile software development/release processes naturally means that pre-deployment testing will be condensed and in some instances not performed. Web-based application testing is a software testing practice that ensures a web-based software application's functionality and quality will perform as per the application's design requirements. Before delivery, web-based software application testing is used to identify underlying issues, such as security breaches, integration issues, functional inconsistencies, environmental challenges, or traffic load. Web-based software application testing typically includes functional testing, web user interface (UI) testing, usability testing, performance testing, security testing, and compatibility testing. Web application compatibility testing determines the compatibility of a web application with operating systems, browsers, mobile browsing, and other printing options.

Despite the importance of web-based application testing systems in general, and particularly in the context of agile software development/deployment, there are still shortcomings. Known web application compatibility testing techniques must run all of the tests, either manually or automatically, on each of the supported search engine platforms, and for each of the supported hardware environments (e.g., laptops, smartphones, desktop computer, servers, and the like). Additionally, known web application testing techniques run all the test cases separately and are not able to locate multiple instances of the same compatibility easily even when the same issue has been found before.

Turning now to an overview of aspects of the present invention, embodiments of the invention provide computer-implemented methods, computer systems and computer program products operable to analyze web-based software applications in order to efficiently and effectively identify and prioritize compatibility issues prior to deployment of the web-based software application. In this detailed description, the web-based software application is referred to as the "product," and the product has been developed and is in the pre-deployment testing phase. The product can be a new product or an update to a previously deployed product. Embodiments of the invention optimize compatibility testing of products by gathering element-event (ELV) pairs of the product and storing them as a global ELV collection (GELVC). In embodiments of the invention, an element can be any GUI (graphical user interface) element (e.g., a widget) or a small application that can display information and/or interact with the user. An element can be as rudimentary as a button, scroll bar, label, dialog box or check box; or it can be something slightly more sophisticated like a search box, tiny map, clock, visitor counter or unit converter. In some embodiments of the invention, the term "element" and/or the term "event" includes the GUI with which the user interacts, as well as the code responsible for the functionality of the element and/or event. In embodiments of the invention, events are the reactions to a particular occurrence that happens in the product and that calls for a reaction. For example, if a button is displayed on a webpage, a user can react to the presence of the button by clicking the button, and the product can react to the user clicking the button by displaying an information box.

In a similar fashion, a set of compatibility tests is identified, along the corresponding set of ELV pairs that are covered by (or tested by) the set of compatibility tests. The corresponding ELV pairs are stored as a covered ELV collection (CELVC) and compared with the GELVC to identify matches between the ELV pairs in the GELVC and the ELV pairs in the CELVC. In some embodiments of the invention, the results of the comparison are used to make a determination that the set of compatibility tests will only test a subset of the ELV pairs in the GELVC. In some embodiments of the invention, the results of the comparison are used to make a determination that the set of compatibility tests will test all of the to-be-tested element-even pairs. In some embodiments of the invention, the results of the comparison include a determination that a subset of the set of compatibility tests will test all of the EVL pairs in the GEVLC.

In embodiments of the invention, the comparison between the GELVC and the CELVC can be performed in a manner that takes into account additional details about the CELVC in order to expand the scope and improve the efficiency of a subsequent overall compatibility recommendation performed in accordance with embodiments of the invention. In embodiments of the invention, the additional details can be a weighting factor assigned to the test-cases represented by the ELV pairs of the CELVC. In some embodiment of the invention, the weighting factor can be user designed. For example, the weighting factor can be based on an expected priority the user places on particular test-cases of the CELVC. In some embodiments of the invention, the weighting factor can be based on whether or not a given test-case covers an ELV pair that is known to (or has been determined to) have a relatively high level or rate of compatibility issues.

As previously noted, embodiments of the invention generate a compatibility testing recommendation based at least in part on the results of the comparison. In embodiments of the invention where the result of the comparison is the determination that the set of compatibility tests will only cover or test a subset of the ELV pairs in the GELVC, the compatibility testing recommendation can include a recommendation that supplemental testing is needed in order to cover the untested subset of the ELV pairs in the GELVC. In embodiments of the invention where the result of the comparison is the determination that the set of compatibility tests will cover or test all of the ELV pairs, the compatibility testing recommendation can include a recommendation that the compatibility tests efficiently cover the ELV pairs of the GELVC. In embodiments of the invention where the result of the comparison is the determination that the subset of the set of compatibility tests will cover or test all of the EVL pairs in the GEVLC, the compatibility testing recommendation can include a recommendation that the portion of the CEVLC beyond the subset of the compatibility tests can be eliminated. Accordingly, embodiments of the invention are operable generate compatibility testing recommendations that provide efficient us of the resources required to carry out compatibility testing of web-based software applications.

In some embodiments of the invention, the compatibility testing recommendation can be in the form of a report that identifies areas where the efficiency of how test-cases are executed can be improved. For example, where a first test-case of the CELVC covers or tests ELV pairs that overlap significantly (e.g., above a threshold of matches) with ELV pairs covered or tested by a second test-case, the report can identify that there may be an opportunity to improve efficiency by eliminating the overlap (e.g., by combining the first test-case with the second test-case B; or by deleting the overlapping ELV pairs from the first test-case or the second test-case).

In some embodiments of the invention, the compatibility testing recommendations and/or reports can be generated using one or more machine learning algorithms. In some embodiments the invention, the compatibility testing recommendations and/or reports can be generate using one or more suitable optimization algorithms.

Turning now to a more detailed description of embodiments of the invention, FIG. 1 depicts a web-based software application (WSA) testing system 100 in accordance with aspects of the invention. Web applications (or web software applications) run in a web browser rather than being installed on a user's device. Web applications run on any device that can access the internet which includes desktop computers, tablets, and mobile phones. Web applications are easily scalable; support multiple browsers and devices; are platform independent; and reduce costs. The WSA testing system 100 includes a variety of computer hardware/software testing tools 102 configured and arranged to perform WSA testing operations by interfacing with a variety of systems, including browsers 110, web/application servers 112, operating systems 114, databases 116, devices 118 (e.g., USB port devices, printers, scanners, media devices, etc.), and the like. In aspects of the invention, the WSA testing system 100 performs both backward compatibility testing and forward compatibility testing. Backward compatibility testing is a technique to verify the behavior and compatibility of the developed hardware or software with their older versions of the hardware or software, Backward compatibility testing is relatively predictable because all of the changes from the previous versions are known. Forward compatibility testing is the processes to verify the behavior and compatibility of the developed hardware or software with the newer versions of the hardware or software. Forward compatibility testing is harder to predict because the changes that will be made in the newer versions are not known.

The compatibility testing tools 102 can be any script, tool, or test automation framework that assist with identifying errors in web applications. WSA testing can be performed automatically or through a combination of automated testing with some manual intervention (e.g., operating one of the compatibility testing tools 102 under the guidance or intervention of a Tester-A (shown in FIG. 1)). In this detailed description, the combination of automated testing with some manual intervention will be referred to a manual testing. Manual testing approaches are used more frequently by developers in the initial phases of the development for testing specific features. Automated testing is usually performed once the software application is entirely developed. Quality Assurance (QA) teams automate test scenarios (e.g., Test-case 1 through Test-case 5 shown in FIG. 5) from the end-users' perspective to evaluate the usability, functionality, and performance of the application. Deciding which suite of compatibility testing tools 102 to use varies according to the nature of the application to be tested. For example, software application testing tools exist to assist with verifying the cross-browser compatibility of a web application. Once automation testing wraps up, human testers (e.g., Tester-A shown in FIG. 1) step in to manually check every feature as well as aesthetics, typically with the aid of visual testing tools, to ensure that the visual elements of the software application appeal to human users. Visual testing tools assist testers with verifying that the user interface (UI) appears correctly to all users by checking, for example, that each element appears in the right shape, size, and position. Visual testing tools also check that these elements appear and function perfectly in multiple environments, screen sizes, operating systems, and the like.

In accordance with aspects of the invention, the compatibility testing tools 102 include a set of compatibility testing modules 104 operable to implement embodiments of the invention. In accordance with embodiments of the invention, the compatibility testing modules 104 include computer-implemented methods, computer systems and/or computer program products operable to test the compatibility of web-based software applications with various operating environments in order to efficiently and effectively identify and prioritize compatibility issues prior to deployment of the web-based software application. In embodiments of the invention, the compatibility testing modules 104 can be implemented as compatibility testing modules (104A shown in FIG. 3), which are describe in greater detail subsequently herein.

A cloud computing system 50 is in wired or wireless electronic communication with the WSA testing system 100. The cloud computing system 50 can supplement, support or replace some or all of the functionality (in any combination) of the system 100. Additionally, some or all of the functionality of the system 100 can be implemented as a node of the cloud computing system 50. Additional details of cloud computing functionality that can be used in connection with aspects of the invention are depicted by the computing environment 1400 shown in FIG. 14 and described in greater detail subsequently herein.

Figure 2:
FIG. 2 depicts a table illustrating element-event pairs embodying aspects of the invention.

FIG. 2 depicts a Table 200 illustrating a simplified example of ELV (element-event) pairs used in accordance with aspects of the invention. In the Table 200, elements and events are represented using shorthand notations. For example, Button1 represents a particular button-type widget element having functionality built into the web-based software application. OnClick and OnTouch represent events or actions that can be initiated by a user with respect to Button1. In embodiments of the invention, the element can be any GUI (graphical user interface) element (e.g., a widget) or a small application that can display information and/or interact with the user. An element can be as rudimentary as a button, scroll bar, label, dialog box or check box; or it can be something slightly more sophisticated like a search box, tiny map, clock, visitor counter or unit converter. The term "element" (or the term "event") can include the graphical portion with which the user interacts, as well as the code (e.g., Functional-Code-A or Functional-Code-B shown in FIG. 7) of the software application that is responsible for the element's functionality (or the event's functionality). In embodiment of the invention, the previously-described GELVC can be implemented as the Table 200, and the Table 200 can be implemented as a relational database similar to Table A (shown in FIG. 5 and described in greater detail subsequently herein).

In embodiments of the invention, the events are actions or occurrences that happen in the software application that call for a reaction. For example, if the user clicks a button on a webpage, the software application could react to that action by displaying an information box. In the case of web-based software applications, events are fired inside the browser window, and tend to be attached to a specific item that resides in it. This might be a single element, a set of elements, the HTML document loaded in the current tab, or the entire browser window. There are many different types of events that can occur, including, for example, where the user selects, clicks, or hovers the cursor over a certain element; the user chooses a key on the keyboard; the user resizes or closes the browser window; a web page finishes loading; a form is submitted; a video is played, paused, or finishes; an error occurs; and the like. To react to an event, an event handler is attached to it. An event handler is a block of code (usually a JavaScript® function created by the programmer) that runs when the event fires. When such an event handler is defined to run in response to an event, the event handler is defined as being "registered." Event handlers include some form of an "event listener" function. Event listener code listen out for the event happening, and the event handler code is run in response to the event happening.

Figure 3:
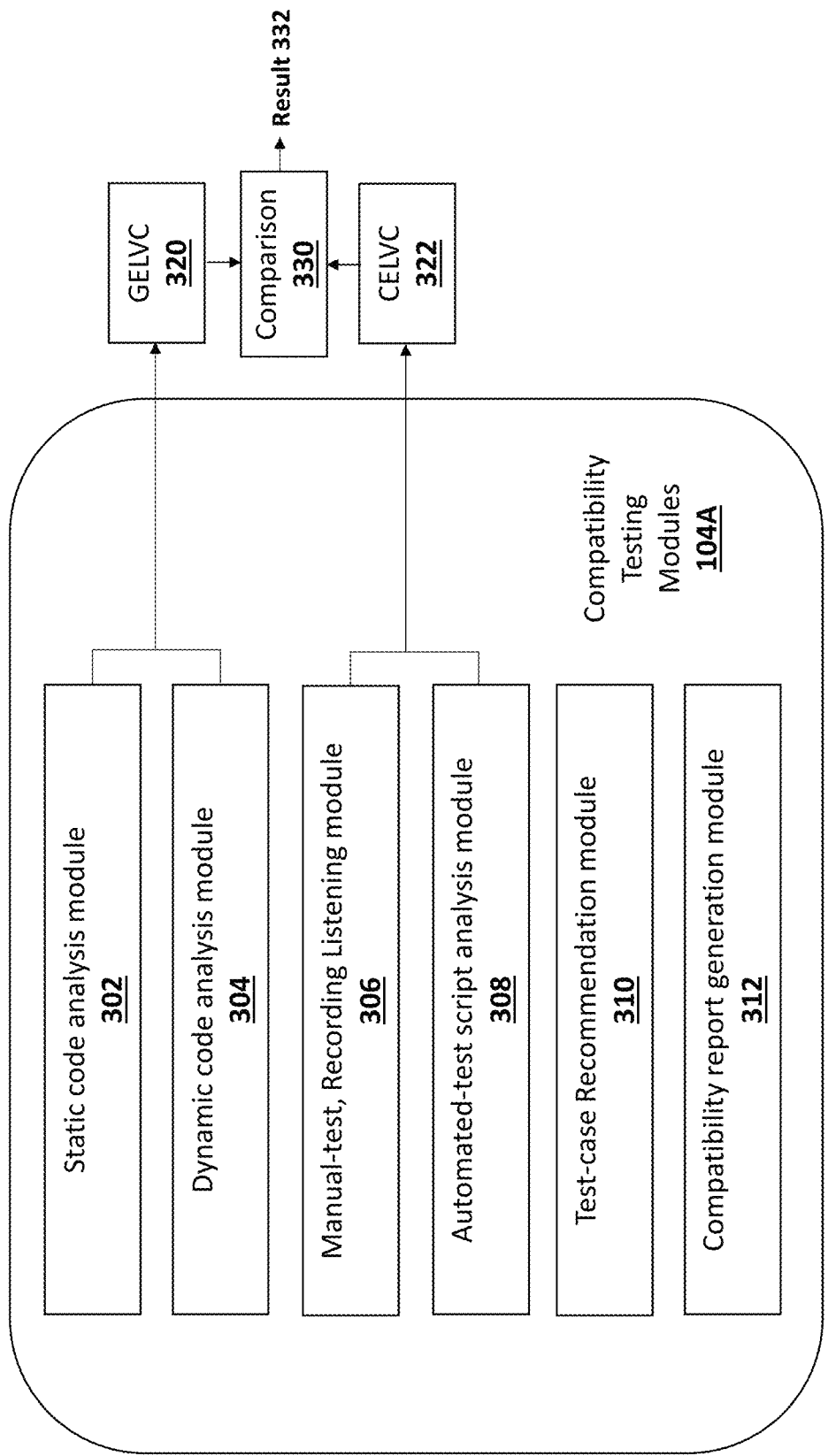
FIG. 3 depicts a block diagram illustrating portions of a system embodying aspects of the invention.
Figure 4:
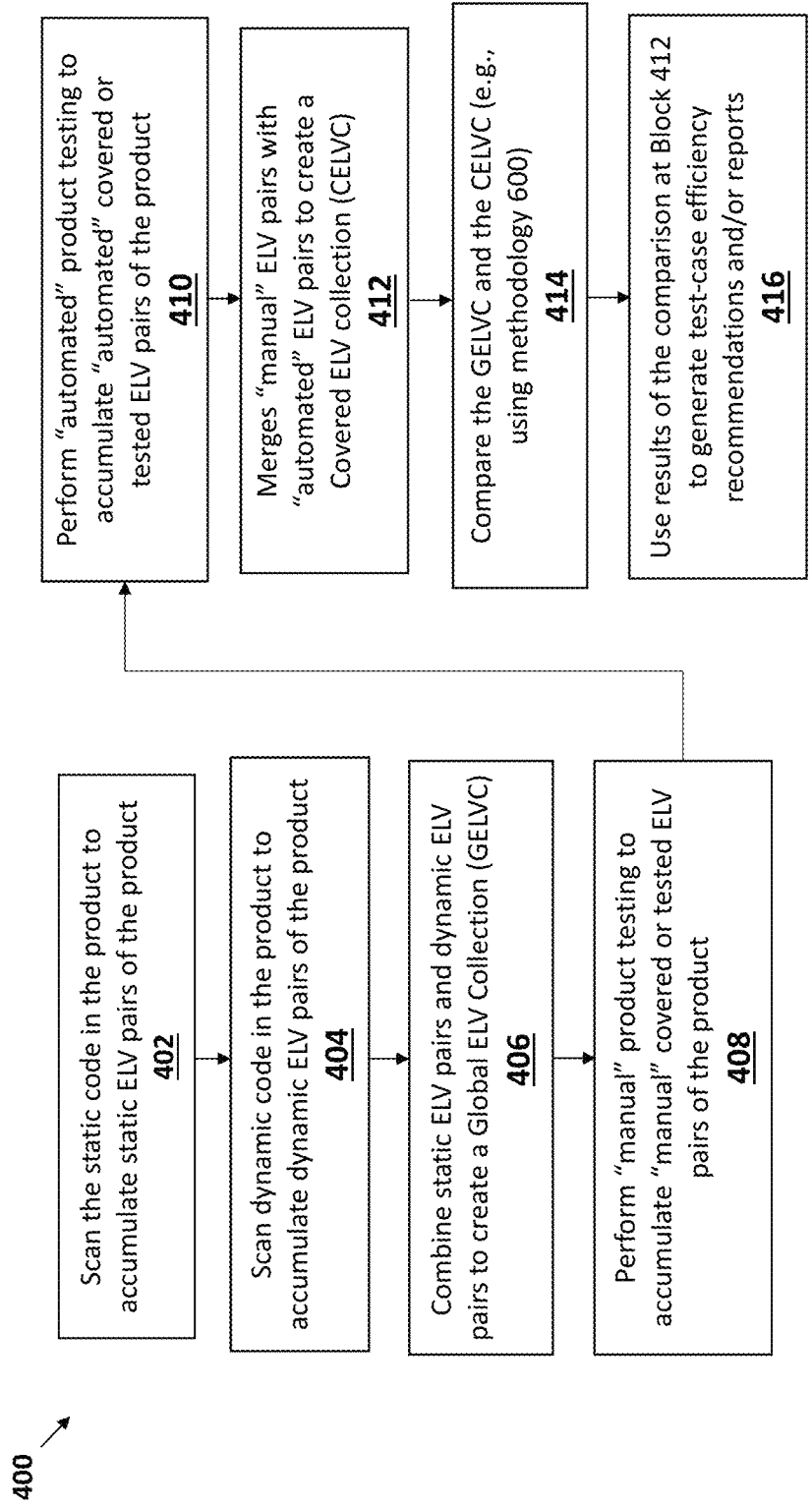
FIG. 4 depicts a flow diagram illustrating a methodology embodying aspects of the invention.

FIG. 3 depicts a non-limiting example of how the compatibility testing modules 104 (shown in FIG. 1) can be implemented as a configuration of compatibility testing modules 104A, along with a comparison module 330, in accordance with aspects of the invention. FIG. 4 illustrates a computer-implemented methodology 400 that is implemented by the compatibility testing modules 104A and the comparison module 330 shown in FIG. 3. The operation of the compatibility testing modules 104A and the comparison module 330 in accordance with aspects of the invention will now be described with references to the structures shown in FIG. 3 and the corresponding operations (or blocks) of the methodology 400 shown in FIG. 4.

In embodiments of the invention, the compatibility testing modules 104A include a static code analysis module 302, a dynamic code analysis module 304, a manual-test recording listening module 306, an automated-test script analysis module 308, a test-case recommendation module 310, and a compatibility report generation module 312, configured and arranged as shown. In aspects of the invention, the module 302 is operable to scan static code of the application-under testing (i.e., the to-be-deployed we-based software application) (Block 402). In some embodiments of the invention, the static code analyzed by the module 302 is HTML code. In aspects of the invention, the module 302 scans the application-under-testing to generate ELV pairs of the HTML code using, for example, existing natural language processing (NLP) techniques such as keyword scanning or regular expressions searching. Regular expression searching is a form of advanced searching that looks for specific patterns as opposed to certain terms and phrases. Regular expression searching uses pattern matching to search for particular strings of characters rather than constructing multiple, literal search queries. HTML is a programming language used to describe the structure of information on a webpage. Together, HTML, CSS (cascading style sheets), and JavaScript make up the essential building blocks of websites worldwide, with CSS controlling a page's appearance and JavaScript programming controlling a page's functionality. HTML documents provide the bones of a webpage, while CSS provides the skin, and JavaScript provides the brains. The code analyzed by the module 302 is "static" in that the analysis performed by module 302 is initiated while the application-under-testing is not running. A webpage can contain headings, paragraphs, images, videos, and many other types of data. Front-end developers use the HTML element to specify what kind of information each item on a webpage contains—for instance, the "p" HTML element indicates a paragraph. Developers also write HTML language code to specify how different items relate to one another in the page's overall structure or document structure. A look under the hood of any website would reveal a basic HTML code page, which is written with an HTML structure editor. The HTML code page provides the structure for all the page's components, including its header element, footer element, main content, and other inline elements.

In aspects of the invention, the module 304 is operable to generate dynamic ELV pairs from dynamic code of the application-under-testing (Block 404). In some embodiments of the invention, the dynamic code analyzed by the module 304 is JavaScript code, where the module 304 includes a code analyzer operable to scan the application-under-testing to generate ELV pairs from the JavaScript code, which render only when the application-under-testing is running. Examples of dynamic ELV pairs include dialog boxes that appear after clicking a button, and that do not contain HTML. In embodiments of the invention, the static ELV pairs from module 302 and the dynamic ELV pairs from module 304 are combined and stored in the global ELV collection (GELVC) 320 (Block 406). In embodiment of the invention, the GELVC 320 can be implemented in the same format as the Table 200 relational database (shown in FIG. 2).

In aspects of the invention, the module 306 is operable to generate ELV pairs that are covered or tested by the manual testing components of an initial suite or set of testing scenarios (Block 408). In accordance with aspects of the invention, the set of initial compatibility tests is received based on conventional standards developed independently of embodiments of the invention. The set of initial compatibility tests includes inefficiencies and redundancies that can be addressed using aspects of the invention. Module 306 can be implemented as a manual-test, recording listening module 306 operable to grab ELV pairs that are covered or tested by the manual testing components of the initial suite or set of testing scenarios. Tester-A (shown in FIG. 1) can manually mark or identify ELV pairs generated by module 306 that have compatibility issues during testing. In accordance with aspects of the invention, the marked/identified ELV pairs having compatibility issues can be included among the historical ELV pair data 810 and/or the historical Test-case data 820 shown in FIGS. 8A and 8B, which are described in greater detail subsequently herein.

In aspects of the invention, the module 308 is operable to collect ELV pairs that are covered or tested by automated testing components of the initial suite or set of testing scenarios (Block 410). Module 308 can be implemented as an automated script analysis system operable to collect ELV pairs that are covered or tested by automated testing components of the initial suite or set of testing scenarios. In embodiments of the invention, the manually tested ELV pairs from module 306 and the automatically tested ELV pairs from module 308 are combined and stored in the covered ELV collection (CELVC) 322 (Block 412).

Figure 6:
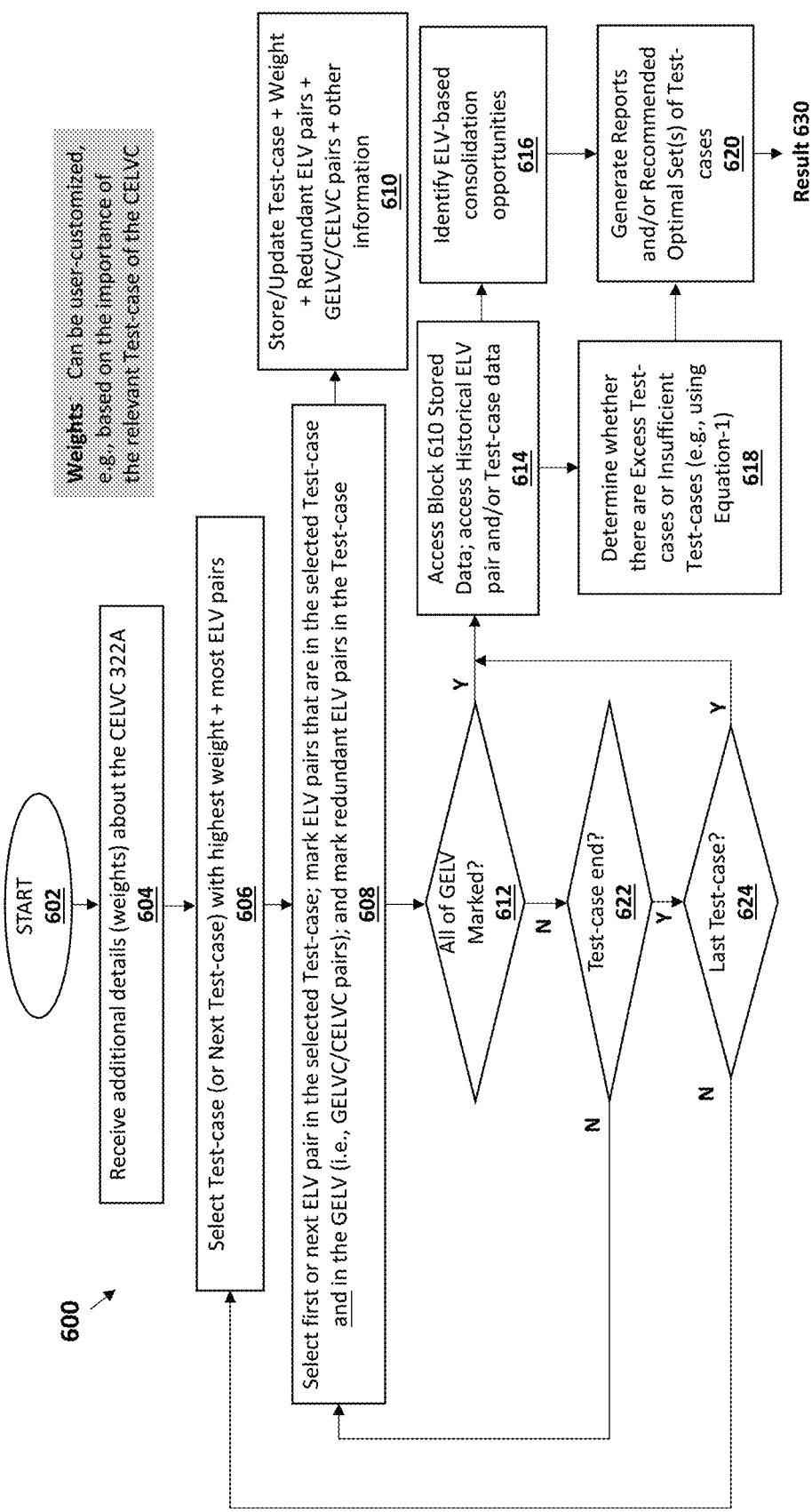
FIG. 6 depicts a flow diagram illustrating a methodology embodying aspects of the invention.

The comparison module 330 is operable to compare the ELV pairs in the GELVC 320 with the ELV pairs in the CELVC 322 to generate results 332 of the comparison (Block 414, which can use the methodology 600 shown in FIG. 6). In embodiments of the invention, the results 332 can take a variety of forms including, for example, identifying matches between the ELV pairs in the GELVC 320 and the ELV pairs in the CELVC 322. In some embodiments of the invention, a first ELV pair can match a second ELV pair based on a match between a shorthand notation (e.g., "Button1" and "OnClick" shown in FIG. 2) that represents the first ELV pair and a shorthand notation that represents the second ELV pair. In some embodiments of the invention, a first ELV pair can match a second ELV pair based on a match between the underlying code functionality of the first ELV pair and the second ELV pair. In other words, the first ELV pair matches the second ELV pair if their element descriptors and event descriptors (e.g., ELV pairs 200 shown in FIG. 2) are technically different but substantially the same underlying code functionality supports or executes the first and second ELV pairs.

In accordance with aspects of the invention, the comparison module 330 is operable to perform the comparison between the GELVC 320 and the CELVC 322 in a manner that takes into account additional details about the CELVC 322 in order to expand the scope and improve the efficiency of the overall compatibility recommendation. In some embodiments of the invention, the set of initial compatibility tests are segmented into individual test-cases (e.g., Test-case 1 through Test-case 5 shown in FIG. 5), where each test-case includes a series of testing operations (manual, or automated, or a combination of manual/automated), and where each test-case can be assigned a weight that is taken into account when generating the results 332 and/or in generating the compatibility test recommendation. In some embodiments of the invention, the weight can be based on an importance of the test-case. Thus, a test-case that covers or tests an ELV pair that executes a relatively minor function in the under-analysis software application product would be assigned a lower weight than a test-case that covers or tests an ELV pair that executes a major function of the under-analysis software application. An example of a major function is any ELV pair that plays a significant role in a user's quality of experience (QoE) or in the fulfillment of SLA (service level agreement) requirements. In general, QoE is a measure of the delight or annoyance a customer experiences when utilizing a service such as web browsing, phone calls, TV broadcasts, and the like. In contrast to quality of service (QoS), which is a measurement of network operating conditions such as noise, crosstalk, or lost or dropped packets, QoE takes into consideration the end-to-end connection and applications that are currently running over that network connection and how multimedia elements such as Internet video or IPTV (internet protocol television) networks are satisfying or meeting the end user's requirements. In some embodiments of the invention, the weighting can be based on whether or not a given test-case covers an ELV pair that is known to have a relatively high level or rate of compatibility issues. Test-cases that cover or test ELV pairs that are known to have a low level or rate of compatibility issues can be assigned a lower weight than test-cases that cover or test ELV pairs that are known to have a higher level or rate of compatibility issues. In some embodiments of the invention, the weighting can be based on the number of different "types" of ELV pairs that are in a test-case. For example, a test-case that covers or tests 3 (three) different types of ELV pairs can be assigned a lower weight than a test-case that covers or tests 8 (eight) different types of ELV pairs. In embodiments of the invention, a "type" of an ELV pair can be the essential function of the ELV pair, and two ELV pairs can have elements and events that are technically different butt the underlying code functions that support or implement the two ELV pairs can be substantially the same.

In embodiments of the invention, the comparison between the GELVC 320 and the CELVC 322 can also take into account various characteristics of the ELV pairs that are compared in order to identify redundancies among the CELVC 322. For example, in some embodiments of the invention, the comparison between the GELVC 320 and the CELVC 322 can also take into account the number of ELV pairs that are covered or tested in multiple separate test-cases of the CELVC 322. In some instances, the ELV pairs that are covered or tested by a given test-case can overlap partially or entirely with the ELV pairs that are covered or tested by a group of test-cases. In such instances, the given test-case is either partially or entirely redundant with the group of test-cases, and the compatibility testing recommendation can include a recommendation that the given test-case can be replaced by or combined with the group of test-cases. As another example, in some embodiments of the invention, the comparison between the GELVC and the CELVC can also take into account the types of ELV pairs that are being compared. As previously noted herein, in embodiments of the invention, a "type" of an ELV pair can be the essential function of the ELV pair, and two ELV pairs can have elements and events that are technically different butt the underlying code functions that support or implement the two ELV pairs can be substantially the same. By taking into account the types of ELV pairs that are compared during the comparison between the GELVC and the CELVC, more redundancies can be uncovered among the ELV pairs of the GELVC and the CELVC, and the scope and efficiency of the overall compatibility recommendation can be further improved.

In some embodiments of the invention, the test-case recommendation module 310 is operable to generate a compatibility testing recommendation based at least in part on the results 332 (Block 416). In some embodiment of the invention, where the results 332 include the determination that the set of compatibility tests will only cover or test a subset of the ELV pairs in the GELVC 320, the compatibility testing recommendation can include a recommendation that supplemental testing is needed in order to cover the untested subset of the ELV pairs in the GELVC 320. In some embodiment of the invention, where the results 332 include the determination that the initial set of compatibility tests will cover or test all of the ELV pairs in the GELVC 320, the compatibility testing recommendation can include a recommendation that the compatibility tests efficiently cover the ELV pairs of the GELVC 320. In some embodiment of the invention, where the results 332 include the determination that the subset of the set of compatibility tests will cover or test all of the EVL pairs in the GEVLC 320, the compatibility testing recommendation can include a recommendation that the portion of the CEVLC 322 beyond the subset of the compatibility tests can be eliminated. Accordingly, embodiments of the invention are operable generate compatibility testing recommendations that provide efficient use of the resources required to carry out compatibility testing of web-based software applications.

In some embodiments of the invention, the test-case recommendation module 310 can work in tandem with the compatibility report generation module 312 to generate the compatibility testing recommendation in the form of a report that identifies areas where the efficiency of how test-cases are executed can be improved (Block 416). For example, where Test-case A covers or tests ELV pairs that overlap significantly (e.g., above a threshold of matches) with ELV pairs in Test-case B, the report can identify that there may be an opportunity to improve efficiency by eliminating the overlap (e.g., by combining Test-case A with Test-case B; or by deleting the overlapping ELV pairs from Test-case A or Test-case B).

In some embodiments of the invention, the compatibility testing recommendations and/or reports generated by the test-case recommendation module 310 and/or the compatibility report generation module 312 can be generated using one or more machine learning algorithms. In some embodiments the invention, the test-case recommendation module 310 and the compatibility report generation module 312 can generate the compatibility testing recommendations and/or reports using one or more suitable optimization algorithms.

FIG. 5 depicts an example of how the CELVC 322 (shown in FIG. 3) can be implemented as a CELVC 322A, which is organized as a table identified as Table A. In some embodiments of the invention, the CELVC 322A and Table A can be implemented as a relational database. The compatibility testing modules 104A (shown in FIG. 3) and the comparison module 330 (shown in FIG. 3) are operable to dynamically create, control, and access the Table A relational database stored in a memory location of either or both of the modules 104A, 330. As previously noted, the GELVC 320 (shown in FIG. 3) can be implemented as the Table 200 (shown in FIG. 2) and can also be implemented as a relational database. The compatibility testing modules 104A and the comparison module 330 are also operable to dynamically create, control, and access the Table 200 relational database stored in a memory location of either or both of the modules 104A, 330. A suitable Table A relational database that can be used in connection with embodiments of the invention is any relational database configured to provide a means of storing related information (e.g., ELV pairs 710, 720 shown in FIG. 7) in such a way that the information and the relationships between the information can be retrieved from it. The data in a relational database can be related according to common keys or concepts, and the ability to retrieve related data from a table is the basis for the term relational database. A relational database management system (RDBMS) of the modules 104A, 330 performs the tasks of determining the way data and other information are stored, maintained and retrieved from the Table A relational database and the Table 200 relational database. For example, where the comparison module 330 is performing comparison operations depicted in the methodology 600 (shown in FIG. 6), the module 330 can be used to access the appropriate data in GELVC 320 (e.g., the Table 200 relational database) and the corresponding appropriate data in the CELVC 322A (e.g., the Table A relational database) to perform the comparison and generate the results 332 (shown in FIG. 3).

In accordance with aspects of the invention, a set of initial compatibility tests is received based on conventional standards developed independently of embodiments of the invention. The set of initial compatibility tests includes inefficiencies and redundancies that can be addressed using aspects of the invention. The set of initial compatibility tests is segmented into individual test-cases (e.g., Test-case 1 through Test-case N (where N=any whole number) shown in FIG. 5), where each test-case includes a series of testing operations (manual, or automated, or a combination of manual/automated) (denoted by s1, s2, s3, etc.). Each testing operation (e.g., s1) corresponds to an ELV pair (e.g., Table+ deselect) that is covered or tested by the testing operation of the test-case. In some embodiments of the invention, the ELV pairs in Table A are in the same format at the ELV pairs 710, 720 shown in FIG. 7.

FIG. 6 depicts a computer-implemented method 600 that can be implemented by the modules 104A, 330 (shown in FIG. 3) in accordance with embodiments of the invention. The methodology 600 starts at block 602 then moves to block 604 to receive additional details about the CELVC 322A. In embodiments of the invention, the additional details about the CELVC 322A can include weighting factors assigned to the test-cases (e.g., Test-case 1 through Test-case N (where N=any whole number) shown in FIG. 5). The weights can be assigned in the manner described in connection with the previous description of the operations of the comparison module 330. For example, the weight received at block 604 can be user-customized, e.g., based on the importance of the relevant test-case of the CELVC 322A.

Figure 7:
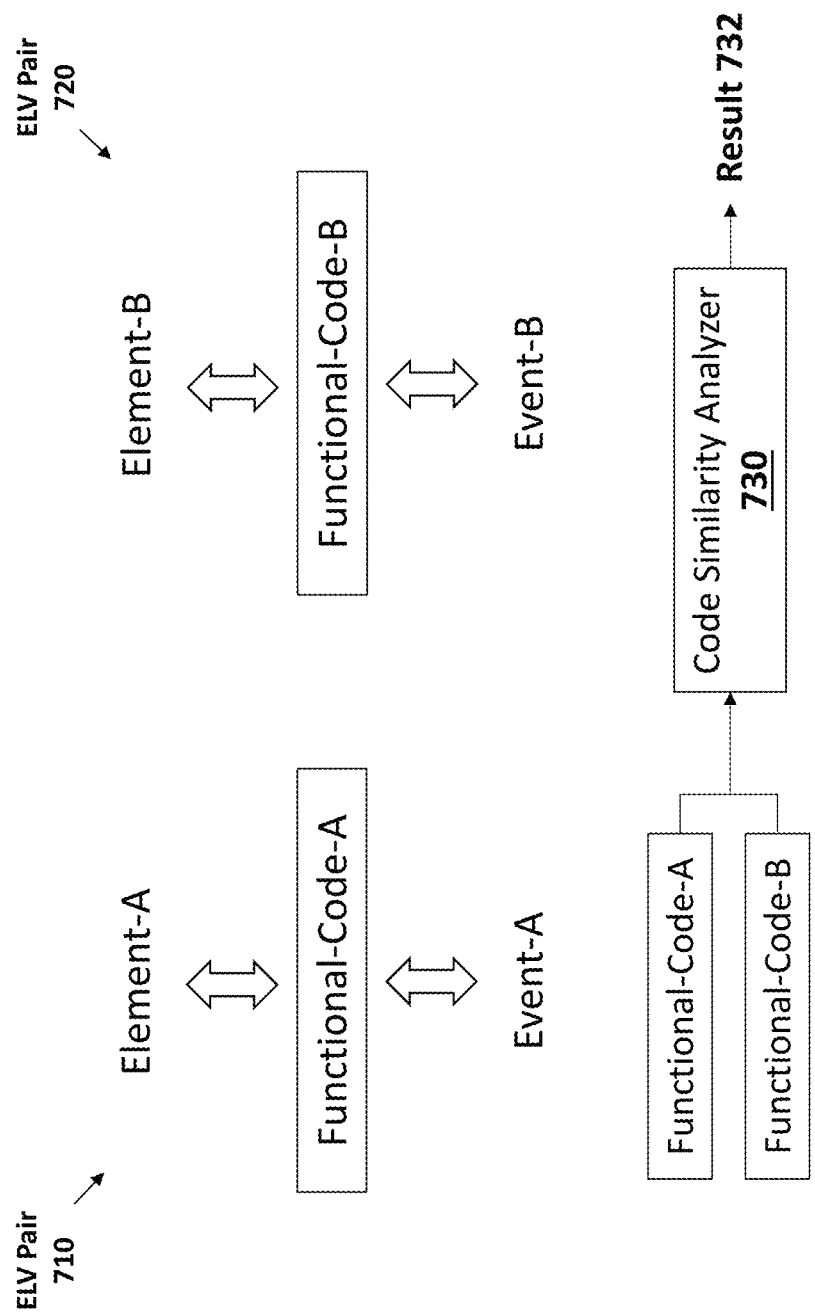
FIG. 7 depicts a block diagram illustrating aspects of the invention.

At block 606, the methodology 600 selects the test-case in CELVC 322A that was assigned the highest weight. If multiple test-cases have the same weight, the methodology 600 breaks the tie based on the test-case with the most ELV pairs, which represents the test-case with the most testing operations (s1, s2, etc.) and having the longest test path. At block 608, the methodology 600 selects the first or next ELV pair in the selected test-case, and compares the selected ELV pair in the selected test-case of the CELVC 322A with the GELVC 320 (shown in FIG. 3). In embodiments of the invention, block 608 is operable to compare the ELV pairs in the GELVC 320 with the ELV pairs in the CELVC 322 to generate results (e.g., results 332 shown in FIG. 3) of the comparison. As shown in FIG. 7, in embodiments of the invention, the results can take a variety of forms including, for example, identifying matches between an ELV pairs 710 in the GELVC 320 and an ELV pair 720 in the CELVC 322. In some embodiments of the invention, ELV pair 710 can match ELV pair 720 based on a match between Element-A (e.g., "Button1" and "OnClick" shown in FIG. 2), which is a shorthand notation that represents the ELV pair 710, and Element-B, which is a shorthand notation that represents the ELV pair 720. In some embodiments of the invention, ELV pair 710 can match ELV pair 720 based on a match between Functional-Code-A of ELV pair 710 and ELV pair 720. In other words, ELV pair 710 matches ELV pair 720 if their element descriptors and event descriptors (e.g., Element-A, Even-A, Element B, Event-B) are technically different but substantially the same underlying code functionality (Functional-Code-A and Functional-Code-B) supports or executes the ELV pairs 710, 720. In accordance with embodiments of the invention, the comparison at block 608 can be performed by a code similarity analyzer 730 to generate a result 732. In embodiments of the invention, the results 732 correspond to the results 332 (shown in FIG. 3).

Referring again to FIG. 6, block 608 marks the ELV pairs that are in the selected test-case of the CELVC 322A and in the GELVC 320. Block 608 also marks redundant ELV pairs in the selected test-case of the CELVC 322A. From block 608 the methodology 600 move to block 610 and decision block 612. At block 610, the methodology 600 stores and/or updates information that identifies the selected test-case; associates the selected test-case with its weighting factor; identifies redundant ELV pairs in the selected test-case; identifies matching GELVC/CELVC pairs; and other compatibility-related information/data about the selected test-case and the GELVC/CELVC comparison.

At decision block 612, the methodology 600 determines whether or not all of the entries in the GELVC 320 have been marked. If the answer to the inquiry at decision block 612 is no, the methodology 600 move to decision block 622 to determine whether the last ELV pair in the selected test-case has been selected. If the answer to the inquiry at decision block 622 is no, the methodology 600 returns to block 608 and performs another iteration of blocks 608, 610 and decision block 612. If the answer to the inquiry at decision block 622 is yes, the methodology 600 move to decision block 624 to determine whether the last test-case in the CELVC 322A has been selected. If the answer to the inquiry at decision block 624 is no, the methodology 600 returns to block 606 and performs another iteration of blocks 606, 608, 610 and decision block 612.

Figure 8A:
FIG. 8A depicts a diagram illustrating historical data embodying aspects of the invention.
Figure 8B:
FIG. 8B depicts a diagram illustrating historical data embodying aspects of the invention.

Returning to decision block 612, if the answer to the inquiry at decision block 612 is yes, the methodology 600 has determined that all of the ELV pairs in the GELVC 320 are covered or tested by the total number of test-cases from the CELVC 322A that has been evaluated by the iterations of the methodology 600 performed to this point. Thus, where the answer to the inquiry at decision block 612 is yes, the methodology 600 moves to block 614 and accesses the information stored at block 610, and also accesses the historical ELV pair data and/or the historical test case data. Examples of the historical ELV pair data and/or the historical test case data are shown in FIGS. 8A and 8B as historical ELV pair data 810 (shown in FIG. 8A) and historical test-case data 820 (shown in FIG. 8B). In accordance with embodiments of the invention, historical data about a variety of ELV pairs and test-cases is gathered from a variety of sources, including, for example, current and prior iterations of the methodology 600; prior test-cases implemented independently of the methodology 600; and other sources. In some embodiments of the invention, the historical ELV pair data 810 can include historical ELV compatibility issues; historical ELV redundancy levels; historical ELV QoE/SLA impact; user-defined ELV data; and the like. User-defined ELV data can include any information related to ELV pairs that has been identified as having relevance to the compatibility performance of the ELV pair. In embodiment of the invention, the historical ELV pair data 810 provides a more granular view (in comparison to the historical Test-case data 820) of the relevant to-be-tested web-based software applications. In some embodiments of the invention, the historical Test-case data 820 can include historical Test-case compatibility issues; historical Test-case redundancy levels; historical Test-case QoE/SLA impact; user-defined Test-case data; and the like. User-defined Test-case data can include any information related to Test-cases that has been identified as having relevance to the compatibility performance of the Test-case. In embodiment of the invention, the historical Test-case data 820 provides a less granular view (in comparison to the historical ELV pair data 810) of the relevant to-be-tested web-based software applications.

From block 614, the methodology 600 moves to block 616 and block 618. At block 618, the methodology 600 determines whether there are excess test cases or insufficient test cases. Because the methodology 600 arrived at block 618 via decision block 612, all of the ELV pairs of the GELVC 320 have been marked as tested, so the remaining options are that the test-cases evaluated by the methodology 600 either include no excess test-cases, or they include excess test-cases. In some embodiments of the invention, the operations at block 618 can be implemented using machine learning algorithms (e.g., the classifier system 1200 shown in FIG. 12). In some embodiments of the invention, the operations at block 618 can be implemented using Equation-1 (FIG. 9), where $C_t$ identifies the total number of test-cases needed to cover or test the GELVC 320. Where $C_t$ is less than the number of test-cases in CELVC 322A, there are excess test-cases in CELVC 322A. Where $C_t$ is greater than the number of test-cases in CELVC 322A, there are insufficient test-cases in CELVC 322A.

Where block 618 determines that there are excess test-cases in the CELVC 322A, block 618 is operable to improve testing efficiency by generating a proposed subset of the CELVC 322A that can be used to cover the GELVC 320. For example, CELVC 322B shown in FIG. 10 depicts an example of a subset recommendation that can be generated at block 618. Where the methodology 600 determines that the originally proposed CELVC 322A included inefficiency and waste, block 618 determines that a subset of CELVC 322A can be generated as CELVC 322B and can cover all of the GELVC 320. In the example depicted in FIGS. 5 and 10, using embodiments of the invention, the methodology 600 and block 618 reduce the N (e.g., N=100) test-cases in CELVC 322A to the three (3) test cases depicted in CELVC 322B.

At block 616, the methodology 600 uses the outputs from block 614 to identify ELV-based opportunities to consolidate testing functions at the ELV-pair-level. For example, where Test-case A has only ELV-1, ELV-2, and ELV-3, and where ELV-1 is also present in Test-case B, ELV-2 is also present in Test-case C, and ELV-3 is also present in Test-case D, block 515 can identify that Test-case A is redundant to Test-cases B-D, so Test-case A could be eliminated. In another example, using the same scenario but where Test-case includes ELV-4 and ELV-5, which have no redundancies among the test-cases, the proposed consolidation can be to reduce Test-case A from five (5) ELV pairs (ELV-1, ELV-2, ELV-3, ELV-4, ELV-5) to three (3) ELV pairs (ELV-4, ELV-5).

The outputs from blocks 618 and 616 are provide to block 620, which is operable to generate reports and/or recommended optimal sets of test-cases (e.g., CELVC 322B) that have efficiencies over the over the initial set of test-cases (e.g., CELCV 322A).

Returning to decision block 622, if the answer to the inquiry at decision block 622 is yes, the methodology 600 moves to decision block 624 to determine whether the last test-case has been selected. If the answer to the inquiry at decision block 624 is yes, the methodology 600 moves to block 614 and performs another iteration of blocks 614, 616, 618, 620. More specifically, where the answer to the inquiry at decision block 624 is yes, the methodology 600 has determined that not all of the ELV pairs in the GELVC 320 are covered or tested by the total number of test-cases from the CELVC 322A that has been evaluated by the iterations of the methodology 600 performed to this point. Thus, where the answer to the inquiry at decision block 624 is yes, the methodology 600 moves through blocks 614, 618 in the same manner previously described except at block 618. Because the methodology 600 arrives at block 618 via decision block 624, not all of the ELV pairs of the GELVC 320 have been marked as tested but all of the CELVC 322A has been evaluated, so the remaining option is that the test-cases evaluated by the methodology 600 (i.e., the test-cases in CELVC 322A) are insufficient to test all of the ELV pairs in the GELVC 320. In some embodiments of the invention, the operations at block 618 can be implemented using machine learning algorithms (e.g., the classifier system 1200 shown in FIG. 12). In some embodiments of the invention, the operations at block 618 can be implemented using Equation-1, where $C_t$ identifies the total number of test-cases needed to cover or test the GELVC 320. Where $C_t$ is less than the number of test-cases in CELVC 322A, there are excess test-cases in CELVC 322A. Where $C_t$ is greater than the number of test-cases in CELVC 322A, there are insufficient test-cases in CELVC 322A.

Where block 618 determines that there are insufficient test-cases in the CELVC 322A, block 618 is operable to improve testing efficiency by identifying the shortcomings of CELCV 322A and recommending ways in which CELVC 322A can be augmented with additional test-cases, or by making modifications to the existing test-cases.

Figure 11:
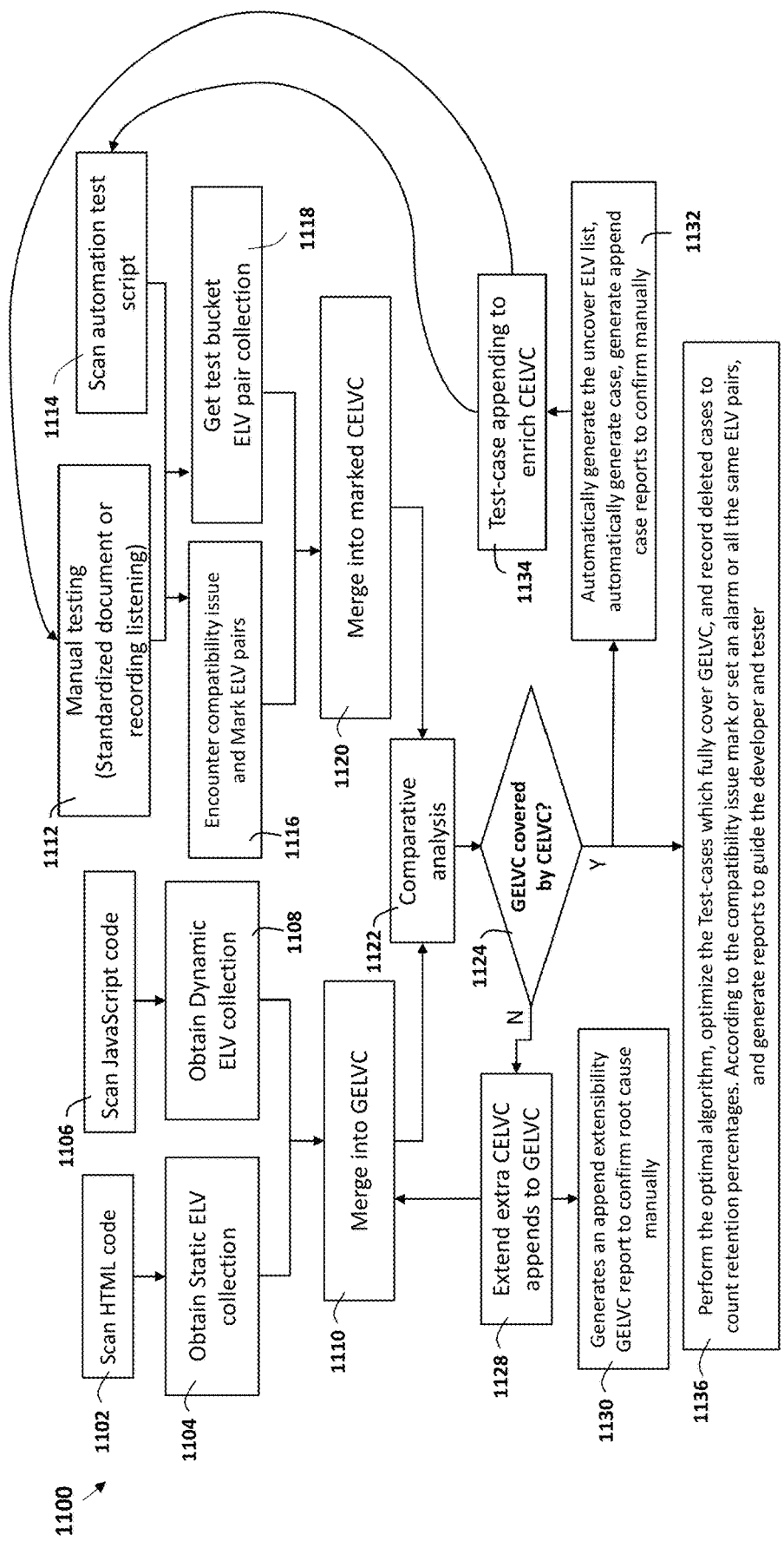
FIG. 11 depicts a flow diagram of a methodology illustrating aspects of the invention.

FIG. 11 depicts a block diagram depicting a methodology 1100 in accordance with embodiments of the invention. At block 1102 HTML codes of a web-based application are scanned, and at block 1104 a static element-event collection is obtained. At block 1106, JavaScript code of the web-based application is scanned, and at block 1108 a dynamic element-event collection is obtained. The outputs from blocks 1104 and 1108 are provided as inputs to block 1110 where they are merged into a GELVC 320. The merged GELVC generated at block 1110 is presented as inputs to a comparative analysis operation at block 1122.

Substantially in parallel with the operations at blocks 1102, 1104, 1106, 1108, 1110, the operations at blocks 1112, 1114, 1116, 1118, 1120 are performed. At block 1112, manual testing (i.e., standardized document or recording listening) of the web-based application is performed, and at block 1114 automation test scripts of the web-based application are scanned. The outputs from blocks 1112 and 1114 are provided to block 1116 where ELV pairs that represent a compatibility issue are marked. The outputs from blocks 1112 and 1114 are also provided to block 1118 where the test bucket of ELV pairs is obtained. The outputs from blocks 1116 and 1118 are provide to block 1120 where they are merged into a marked CELVC. The output from block 1120 is also provided also provided to block 1122 where a comparative analysis of the GELVC and the CELVC is performed.

From block 1122, the methodology 1100 moves to decision block 1124. At decision block 1124, the methodology 1100 determines whether or not the GELVC is covered by the CELVC. More specifically, decision block 1124 determines whether or not all of the ELV pairs in the GELVC are tested by the test-cases of the CELVC. If the answer to the inquiry at decision block 1124 is no, additional test-cases are needed, and the methodology 1100 moves to block 1128 and extends or generates extra CELVC to append to GELVC. From block 1128, the methodology 1100 moves to blocks 1130 and generates an append-extensibility GELVC report to confirm root causes manually. From block 1128, the methodology 1100 also returns to block 1110 to perform the operations at block 1110 again and cycle again through the comparative analysis at block 1122. If the answer to the inquiry at decision block 1124 is yes, extra test-cases are present in the CELVC so there are opportunities to make the CELVC more efficient. Thus, the methodology 1100 moves to block 1132 and block 1136. Block 1132 automatically generates the uncovered CELVC list, automatically generates test-cases, and generates and appends case reports that can be confirmed manually. From block 1132, the methodology 1100 moves to block 1134 where the methodology 1100 appends test cases to enrich CELVC. From block 1134, the methodology 1100 returns to blocks 1112 and 1114 again and cycle again through the operations that are downstream from blocks 1112 and 1114. Block 1136 performs the optimal algorithm (methodology 600 shown in FIG. 6) to optimize the test cases which fully cover GELVC, and record deleted cases to count retention percentages. According to the compatibility issue, mark or set an alarm for all the same ELV pairs and generate reports to guide the developer and the Tester-A.

An example of machine learning techniques that can be used to implement aspects of the invention (e.g., the modules 310, 312, 330 shown in FIG. 3; and blocks 606, 608, 616, 618, 620 shown in FIG. 6) will be described with reference to FIGS. 12 and 13. Machine learning models configured and arranged according to embodiments of the invention will be described with reference to FIG. 12.

Figure 12:
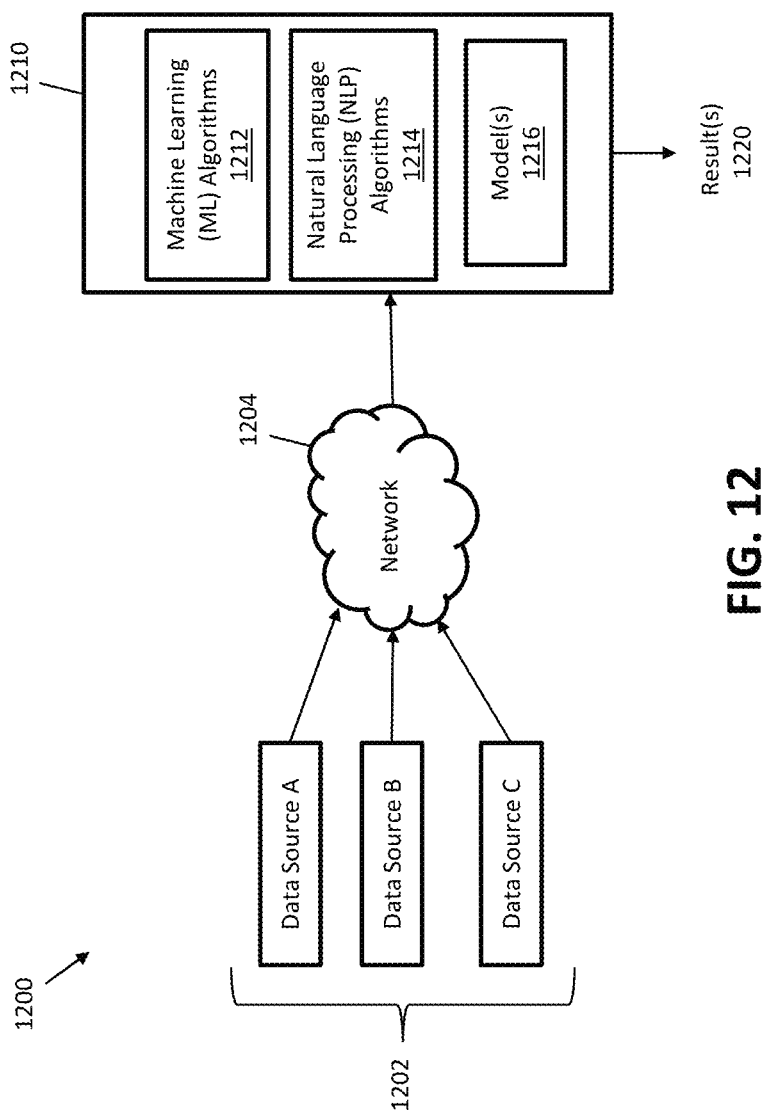
FIG. 12 depicts a machine learning system that can be utilized to implement aspects of the invention.

FIG. 12 depicts a block diagram showing a machine learning or classifier system 1200 capable of implementing various aspects of the invention described herein. More specifically, the functionality of the system 1200 is used in embodiments of the invention to generate various models and sub-models that can be used to implement computer functionality in embodiments of the invention. The system 1200 includes multiple data sources 1202 in communication through a network 1204 with a classifier 1210. In some aspects of the invention, the data sources 1202 can bypass the network 1204 and feed directly into the classifier 1210. The data sources 1202 provide data/information inputs that will be evaluated by the classifier 1210 in accordance with embodiments of the invention. The data sources 1202 also provide data/information inputs that can be used by the classifier 1210 to train and/or update model(s) 1216 created by the classifier 1210. The data sources 1202 can be implemented as a wide variety of data sources, including but not limited to, sensors configured to gather real time data, data repositories (including training data repositories), and outputs from other classifiers. The network 1204 can be any type of communications network, including but not limited to local networks, wide area networks, private networks, the Internet, and the like.

Figure 14:
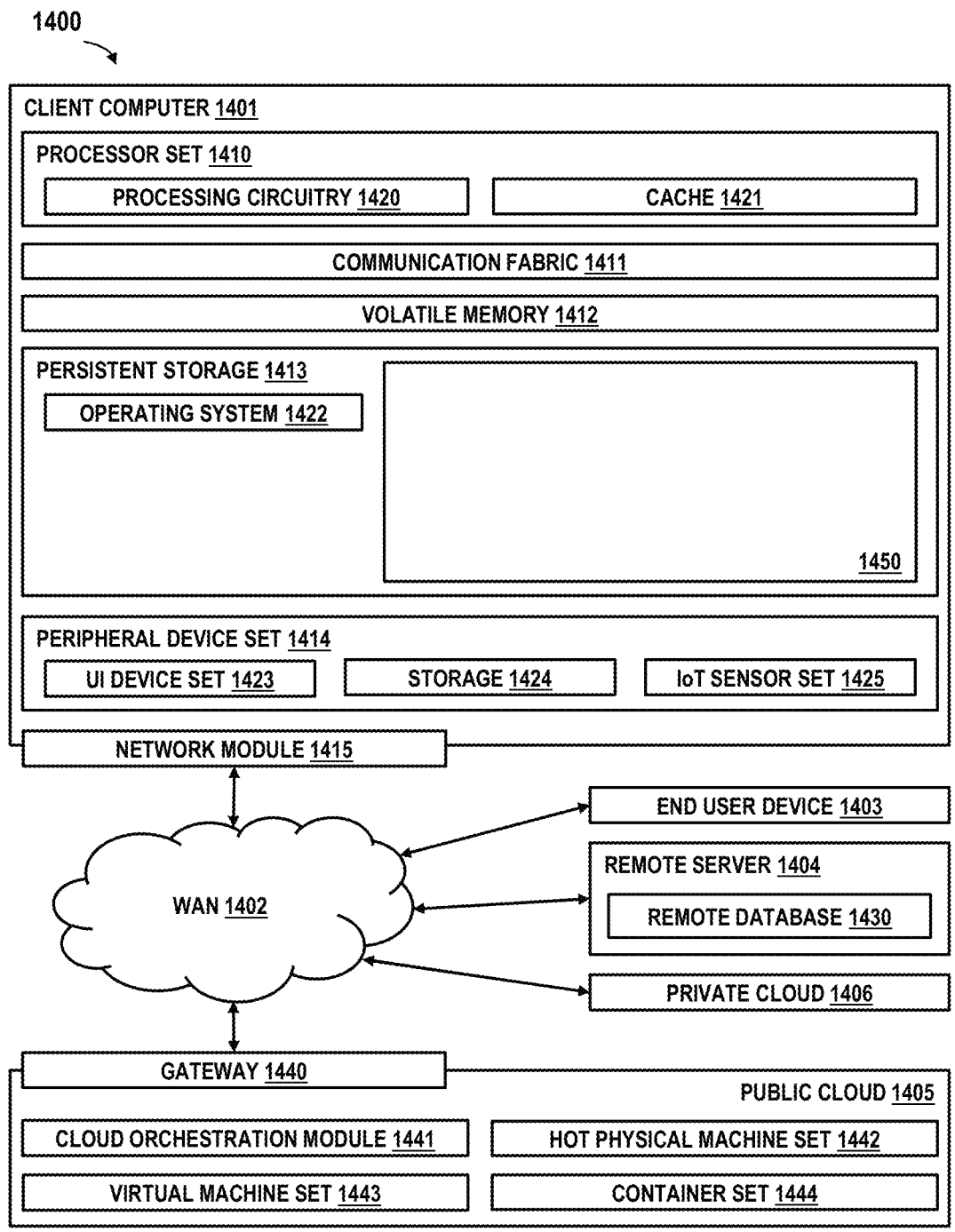
FIG. 14 depicts is a computing environment capable of implementing aspects of the invention.

The classifier 1210 can be implemented as algorithms executed by a programmable computer such as a computing environment 1450 (shown in FIG. 14). As shown in FIG. 12, the classifier 1210 includes a suite of machine learning (ML) algorithms 1212; natural language processing (NLP) algorithms 1214; and model(s) 1216 that are relationship (or prediction) algorithms generated (or learned) by the ML algorithms 1212. The algorithms 1212, 1214, 1216 of the classifier 1210 are depicted separately for ease of illustration and explanation. In embodiments of the invention, the functions performed by the various algorithms 1212, 1214, 1216 of the classifier 1210 can be distributed differently than shown. For example, where the classifier 1210 is configured to perform an overall task having sub-tasks, the suite of ML algorithms 1212 can be segmented such that a portion of the ML algorithms 1212 executes each sub-task and a portion of the ML algorithms 1212 executes the overall task. Additionally, in some embodiments of the invention, the NLP algorithms 1214 can be integrated within the ML algorithms 1212.

The NLP algorithms 1214 include speech recognition functionality that allows the classifier 1210, and more specifically the ML algorithms 1212, to receive natural language data (text and audio) and apply elements of language processing, information retrieval, and machine learning to derive meaning from the natural language inputs and potentially take action based on the derived meaning. The NLP algorithms 1214 used in accordance with aspects of the invention can also include speech synthesis functionality that allows the classifier 1210 to translate the result(s) 1220 into natural language (text and audio) to communicate aspects of the result(s) 1220 as natural language communications.

The NLP and ML algorithms 1214, 1212 receive and evaluate input data (i.e., training data and data-under-analysis) from the data sources 1202. The ML algorithms 1212 includes functionality that is necessary to interpret and utilize the input data's format. For example, where the data sources 1202 include image data, the ML algorithms 1212 can include visual recognition software configured to interpret image data. The ML algorithms 1212 apply machine learning techniques to received training data (e.g., data received from one or more of the data sources 1202) in order to, over time, create/train/update one or more models 1216 that model the overall task and the sub-tasks that the classifier 1210 is designed to complete.

Figure 13:
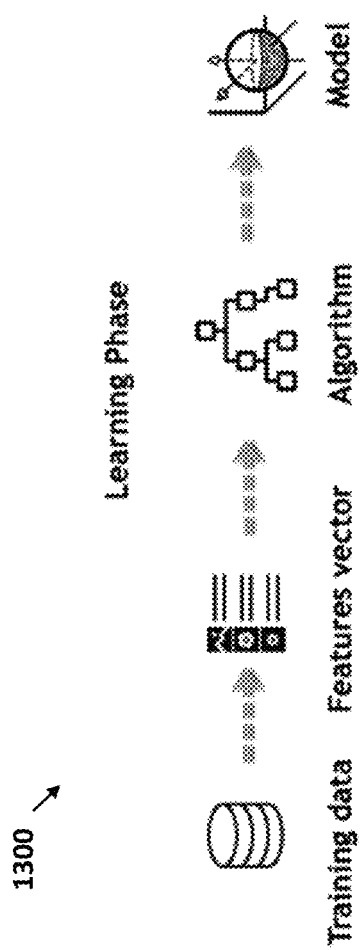
FIG. 13 depicts a learning phase that can be implemented by the machine learning system shown in FIG. 12.

Referring now to FIGS. 12 and 13 collectively, FIG. 13 depicts an example of a learning phase 1300 performed by the ML algorithms 1212 to generate the above-described models 1216. In the learning phase 1300, the classifier 1210 extracts features from the training data and coverts the features to vector representations that can be recognized and analyzed by the ML algorithms 1212. The features vectors are analyzed by the ML algorithm 1212 to "classify" the training data against the target model (or the model's task) and uncover relationships between and among the classified training data. Examples of suitable implementations of the ML algorithms 1212 include but are not limited to neural networks, support vector machines (SVMs), logistic regression, decision trees, hidden Markov Models (HMMs), etc. The learning or training performed by the ML algorithms 1212 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 1210 and the ML algorithms 1212. Unsupervised learning can utilize additional learning/training methods including, for example, clustering, anomaly detection, neural networks, deep learning, and the like.

When the models 1216 are sufficiently trained by the ML algorithms 1212, the data sources 1202 that generate "real world" data are accessed, and the "real world" data is applied to the models 1216 to generate usable versions of the results 1220. In some embodiments of the invention, the results 1220 can be fed back to the classifier 1210 and used by the ML algorithms 1212 as additional training data for updating and/or refining the models 1216.

In aspects of the invention, the ML algorithms 1212 and the models 1216 can be configured to apply confidence levels (CLs) to various ones of their results/determinations (including the results 1220) in order to improve the overall accuracy of the particular result/determination. When the ML algorithms 1212 and/or the models 1216 make a determination or generate a result for which the value of CL is below a predetermined threshold (TH) (i.e., CL<TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 1210 can be configured to apply confidence levels (CLs) to the results 1220. When the classifier 1210 determines that a CL in the results 1220 is below a predetermined threshold (TH) (i.e., CL<TH), the results 1220 can be classified as sufficiently low to justify a classification of "no confidence" in the results 1220. If CL>TH, the results 1220 can be classified as sufficiently high to justify a determination that the results 1220 are valid. Many different predetermined TH levels can be provided such that the results 1220 with CL>TH can be ranked from the highest CL>TH to the lowest CL>TH.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 14 depicts an example computing environment 1400 that can be used to implement aspects of the invention. Computing environment 1400 contains an example of an environment for the execution of at least some of the computer code involved in performing the inventive methods, such as the computer-implemented method of performing compatibility testing of web-based software applications to efficiently and effectively identify and prioritize compatibility issues in web-based software applications 1450. In addition to block 1450, computing environment 1400 includes, for example, computer 1401, wide area network (WAN) 1402, end user device (EUD) 1403, remote server 1404, public cloud 1405, and private cloud 1406. In this embodiment, computer 1401 includes processor set 1410 (including processing circuitry 1420 and cache 1421), communication fabric 1411, volatile memory 1412, persistent storage 1413 (including operating system 1422 and block 1450, as identified above), peripheral device set 1414 (including user interface (UI) device set 1423, storage 1424, and Internet of Things (IoT) sensor set 1425), and network module 1415. Remote server 1404 includes remote database 1430. Public cloud 1405 includes gateway 1440, cloud orchestration module 1441, host physical machine set 1442, virtual machine set 1443, and container set 1444.

COMPUTER 1401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1430. As is well understood in the art of computer technology, and depending upon the technology, performance of a computer-implemented method may be distributed among multiple computers and/or between multiple locations. On the other hand, in this presentation of computing environment 1400, detailed discussion is focused on a single computer, specifically computer 1401, to keep the presentation as simple as possible. Computer 1401 may be located in a cloud, even though it is not shown in a cloud in FIG. 14. On the other hand, computer 1401 is not required to be in a cloud except to any extent as may be affirmatively indicated.

PROCESSOR SET 1410 includes one, or more, computer processors of any type now known or to be developed in the future. Processing circuitry 1420 may be distributed over multiple packages, for example, multiple, coordinated integrated circuit chips. Processing circuitry 1420 may implement multiple processor threads and/or multiple processor cores. Cache 1421 is memory that is located in the processor chip package(s) and is typically used for data or code that should be available for rapid access by the threads or cores running on processor set 1410. Cache memories are typically organized into multiple levels depending upon relative proximity to the processing circuitry. Alternatively, some, or all, of the cache for the processor set may be located "off chip." In some computing environments, processor set 1410 may be designed for working with qubits and performing quantum computing.

Computer readable program instructions are typically loaded onto computer 1401 to cause a series of operational steps to be performed by processor set 1410 of computer 1401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1421 and the other storage media discussed below. The program instructions, and associated data, are accessed by processor set 1410 to control and direct performance of the inventive methods. In computing environment 1400, at least some of the instructions for performing the inventive methods may be stored in block 1450 in persistent storage 1413.

COMMUNICATION FABRIC 1411 is the signal conduction path that allows the various components of computer 1401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1412 is any type of volatile memory now known or to be developed in the future. Examples include dynamic type random access memory (RAM) or static type RAM. Typically, volatile memory 1412 is characterized by random access, but this is not required unless affirmatively indicated. In computer 1401, the volatile memory 1412 is located in a single package and is internal to computer 1401, but, alternatively or additionally, the volatile memory may be distributed over multiple packages and/or located externally with respect to computer 1401.

PERSISTENT STORAGE 1413 is any form of non-volatile storage for computers that is now known or to be developed in the future. The non-volatility of this storage means that the stored data is maintained regardless of whether power is being supplied to computer 1401 and/or directly to persistent storage 1413. Persistent storage 1413 may be a read only memory (ROM), but typically at least a portion of the persistent storage allows writing of data, deletion of data and re-writing of data. Some familiar forms of persistent storage include magnetic disks and solid state storage devices. Operating system 1422 may take several forms, such as various known proprietary operating systems or open source Portable Operating System Interface-type operating systems that employ a kernel. The code included in block 1450 typically includes at least some of the computer code involved in performing the inventive methods.

PERIPHERAL DEVICE SET 1414 includes the set of peripheral devices of computer 1401. Data communication connections between the peripheral devices and the other components of computer 1401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1423 may include components such as a display screen, speaker, microphone, wearable devices (such as goggles and smart watches), keyboard, mouse, printer, touchpad, game controllers, and haptic devices. Storage 1424 is external storage, such as an external hard drive, or insertable storage, such as an SD card. Storage 1424 may be persistent and/or volatile. In some embodiments, storage 1424 may take the form of a quantum computing storage device for storing data in the form of qubits. In embodiments where computer 1401 is required to have a large amount of storage (for example, where computer 1401 locally stores and manages a large database) then this storage may be provided by peripheral storage devices designed for storing very large amounts of data, such as a storage area network (SAN) that is shared by multiple, geographically distributed computers. IoT sensor set 1425 is made up of sensors that can be used in Internet of Things applications. For example, one sensor may be a thermometer and another sensor may be a motion detector.

NETWORK MODULE 1415 is the collection of computer software, hardware, and firmware that allows computer 1401 to communicate with other computers through WAN 1402. Network module 1415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1415 are performed on the same physical hardware device. In other embodiments (for example, embodiments that utilize software-defined networking (SDN)), the control functions and the forwarding functions of network module 1415 are performed on physically separate devices, such that the control functions manage several different network hardware devices. Computer readable program instructions for performing the inventive methods can typically be downloaded to computer 1401 from an external computer or external storage device through a network adapter card or network interface included in network module 1415.

WAN 1402 is any wide area network (for example, the internet) capable of communicating computer data over non-local distances by any technology for communicating computer data, now known or to be developed in the future. In some embodiments, the WAN 1402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1403 is any computer system that is used and controlled by an end user (for example, a customer of an enterprise that operates computer 1401), and may take any of the forms discussed above in connection with computer 1401. EUD 1403 typically receives helpful and useful data from the operations of computer 1401. For example, in a hypothetical case where computer 1401 is designed to provide a recommendation to an end user, this recommendation would typically be communicated from network module 1415 of computer 1401 through WAN 1402 to EUD 1403. In this way, EUD 1403 can display, or otherwise present, the recommendation to an end user. In some embodiments, EUD 1403 may be a client device, such as thin client, heavy client, mainframe computer, desktop computer and so on.

REMOTE SERVER 1404 is any computer system that serves at least some data and/or functionality to computer 1401. Remote server 1404 may be controlled and used by the same entity that operates computer 1401. Remote server 1404 represents the machine(s) that collect and store helpful and useful data for use by other computers, such as computer 1401. For example, in a hypothetical case where computer 1401 is designed and programmed to provide a recommendation based on historical data, then this historical data may be provided to computer 1401 from remote database 1430 of remote server 1404.

PUBLIC CLOUD 1405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1405 is performed by the computer hardware and/or software of cloud orchestration module 1441. The computing resources provided by public cloud 1405 are typically implemented by virtual computing environments that run on various computers making up the computers of host physical machine set 1442, which is the universe of physical computers in and/or available to public cloud 1405. The virtual computing environments (VCEs) typically take the form of virtual machines from virtual machine set 1443 and/or containers from container set 1444. It is understood that these VCEs may be stored as images and may be transferred among and between the various physical machine hosts, either as images or after instantiation of the VCE. Cloud orchestration module 1441 manages the transfer and storage of images, deploys new instantiations of VCEs and manages active instantiations of VCE deployments. Gateway 1440 is the collection of computer software, hardware, and firmware that allows public cloud 1405 to communicate through WAN 1402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1406 is similar to public cloud 1405, except that the computing resources are only available for use by a single enterprise. While private cloud 1406 is depicted as being in communication with WAN 1402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1405 and private cloud 1406 are both part of a larger hybrid cloud.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" and variations thereof are used herein to mean "serving as an example, instance or illustration." Any embodiment or design described herein as "exemplary" is not necessarily to be construed as preferred or advantageous over other embodiments or designs. The terms "at least one," "one or more," and variations thereof, can include any integer number greater than or equal to one, i.e. one, two, three, four, etc. The terms "a plurality" and variations thereof can include any integer number greater than or equal to two, i.e., two, three, four, five, etc. The term "connection" and variations thereof can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrases "in signal communication", "in communication with," "communicatively coupled to," and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method of analyzing compatibility of a web-based software application with a proposed computing environment for executing the web-based software application, the computer-implemented method comprising:
    accessing, using a processor system, the web-based software application, wherein the web-based software application includes static code, dynamic code, generating multiple instances of static element-event pairs associated with the static code, and generating multiple instances of dynamic element-event pairs associated with the dynamic code;
    generating, using the processor system, global element-event pairs of the web-based software application by scanning, using the processor system, the static code and the dynamic code of the web-based software application to generate a corresponding set of the static element-event pairs and the dynamic element-event pairs of the web-based software application;
    wherein scanning the static code comprises using a first code analyzer of the processor system to scan the static code of the web-based software application;
    wherein scanning the dynamic code comprises using a second code analyzer of the processor system to scan the dynamic code of the web-based software application while the web-based software application is running;
    performing a comparison of the global element-event pairs with covered element-event pairs comprising global element-event pairs that can be tested by a set of initial compatibility tests; and
    generating a compatibility testing recommendation based at least in part on a result of the comparison.

2. The computer-implemented method of claim 1, wherein the result of the comparison comprises a determination that applying the set of initial compatibility tests to the web-based software application will test a subset of the global element-event pairs.

3. The computer-implemented method of claim 1, wherein the result of the comparison comprises a determination that applying the set of initial compatibility tests to the web-based software application will test all of the global element-event pairs.

4. The computer-implemented method of claim 1, wherein the result of the comparison comprises a determination that a subset of the set of initial compatibility tests applied to the web-based software application will test all of the global element-event pairs.

5. The computer-implemented method of claim 1, wherein:
    the computer-implemented method further comprises identifying a redundancy among the covered element-event pairs; and
    the compatibility testing recommendation is based at least in part on the redundancy.

6. The computer-implemented method of claim 5, wherein the compatibility testing recommendation comprises a recommendation to remove the redundancy.

7. A computer system for analyzing compatibility of a web-based software application with a proposed computing environment for executing the web-based software application, the computer system comprising a processor system coupled to a memory, wherein the processor system is operable to perform processor system operations comprising:
  accessing the web-based software application, wherein the web-based software application includes static code, dynamic code, generating multiple instances of static element-event pairs associated with the static code, and generating multiple instances of dynamic element-event pairs associated with the dynamic code;
  generating global element-event pairs of the web-based software application by scanning the static code and the dynamic code of the web-based software application to generate a corresponding set of the static element-event pairs and the dynamic element-event pairs of the web-based software application;
  wherein scanning the static code comprises using a first code analyzer of the processor system to scan the static code of the web-based software application
  wherein scanning the dynamic code comprises using a second code analyzer of the processor system to scan the dynamic code of the web-based software application while the web-based software application is running;
  performing a comparison of the global element-event pairs with covered element-event pairs comprising global element-event pairs that can be tested by a set of initial compatibility tests; and
  generating a compatibility testing recommendation based at least in part on a result of the comparison.

8. The computer system of claim 7, wherein the result of the comparison comprises a determination that applying the set of initial compatibility tests to the web-based software application will test a subset of the global element-event pairs.

9. The computer system of claim 7, wherein the result of the comparison comprises a determination that applying the set of initial compatibility tests to the web-based software application will test all of the global element-event pairs.

10. The computer system of claim 7, wherein the result of the comparison comprises a determination that a subset of the set of initial compatibility tests applied to the web-based software application will test all of the global element-event pairs.

11. The computer system of claim 7, wherein:
  the processor operations further comprise identifying a redundancy among the covered element-event pairs; and
  the compatibility testing recommendation is based at least in part on the redundancy.

12. The computer system of claim 11, wherein the compatibility testing recommendation comprises a recommendation to remove the redundancy.

13. A computer program product for analyzing compatibility of a web-based software application with a proposed computing environment for executing the web-based software application, the computer program product comprising a computer readable program stored on a computer readable storage medium, wherein the computer readable program, when executed on a processor system, causes the processor system to perform processor system operations comprising:
  accessing the web-based software application, wherein the web-based software application includes static code, dynamic code, generating multiple instances of static element-event pairs associated with the static code, and generating multiple instances of dynamic element-event pairs associated with the dynamic code;
  generating global element-event pairs of the web-based software application by scanning the static code and the dynamic code of the web-based software application to generate a corresponding set of the static element-event pairs and the dynamic element-event pairs of the web-based software application;
  wherein scanning the static code comprises using a first code analyzer of the processor system to scan the static code of the web-based software application;
  wherein scanning the dynamic code comprises using a second code analyzer of the processor system to scan the dynamic code of the web-based software application while the web-based software application is running;
  performing a comparison of the global element-event pairs with covered element-event pairs comprising global element-event pairs that can be tested by a set of initial compatibility tests; and
  generating a compatibility testing recommendation based at least in part on a result of the comparison.

14. The computer program product of claim 13, wherein the result of the comparison comprises a determination that applying the set of initial compatibility tests to the web-based software applications will test a subset of the global element-event pairs.

15. The computer program product of claim 13, wherein the result of the comparison comprises a determination that applying the set of initial compatibility tests to the web-based software application will test all of the global element-event pairs.

16. The computer program product of claim 13, wherein the result of the comparison comprises a determination that a subset of the set of initial compatibility tests applied to the web-based software application will test all of the global element-event pairs.

17. The computer program product of claim 13, wherein:
  the processor operations further comprise identifying a redundancy among the covered element-event pairs; and
  the compatibility testing recommendation is based at least in part on the redundancy.

18. The computer program product of claim 17, wherein the compatibility testing recommendation comprises a recommendation to remove the redundancy.

19. A computer-implemented method of analyzing compatibility of a web-based software application with a proposed computing environment for executing the web-based software application, the computer-implemented method comprising:
  accessing, using a processor system, the web-based software application, wherein the web-based software application includes static code, dynamic code, generating multiple instances of static element-event pairs associated with the static code, and generating multiple instances of dynamic element-event pairs associated with the dynamic code,
  generating using the processor system, global element-event pairs of the web-based software application by scanning, using the processor system, the static code and the dynamic code of the web-based software application to generate a corresponding set of the static element-event pairs and the dynamic element-event pairs of the web-based software application;

wherein scanning the static code comprises using a first code analyzer of the processor system to scan the static code of the web-based software application;

wherein scanning the dynamic code comprises using a second code analyzer of the processor system to scan the dynamic code of the web-based software application while the web-based software application is running;

performing a weighted comparison of the global element-event pairs with covered element-event pairs comprising global element-event pairs that can be tested by a set of initial compatibility tests; and generating a compatibility testing recommendation based at least in part on a result of the weighted comparison.

20. The computer-implemented method of claim 19, wherein:
a first type of the result of the weighted comparison comprises a first determination that applying the set of initial compatibility tests to the web-based software application will test a subset of the global element-event pairs;
a second type of the result of the weighted comparison comprises a second determination that applying the set of initial compatibility tests to the web-based software application will test all of the global element-event pairs; and
a third type of the result of the weighted comparison comprises a third determination that a subset of the set of initial compatibility tests applied to the web-based software application will test all of the global element-event pairs.

21. The computer-implemented method of claim 20, wherein:
the computer-implemented method further comprises identifying a redundancy among the covered element-event pairs;
the compatibility testing recommendation is based at least in part on the redundancy; and
the compatibility testing recommendation comprises a recommendation to remove the redundancy.

22. The computer-implemented method of claim 21, wherein the compatibility testing recommendation is generated using a machine learning algorithm.

23. A computer program product for analyzing compatibility of a web-based software application with a proposed computing environment for executing the web-based software application, the computer program product comprising a computer readable program stored on a computer readable storage medium, wherein the computer readable program, when executed on a processor system, causes the processor system to perform processor system operations comprising:

accessing the web-based software application, wherein the web-based software application includes static code dynamic code, generating multiple instances of static element-event pairs associated with the static code, and generating multiple instances of dynamic element-event pairs associated with the dynamic code;

generating global element-event pairs of the web-based software application by scanning the static code and the dynamic code of the web-based software application to generate a corresponding set of the static element-event pairs and the dynamic element-event pairs of the web-based software application;

wherein scanning the static code comprises using a first code analyzer of the processor system to scan the static code of the web-based software application;

wherein scanning the dynamic code comprises using a second code analyzer of the processor system to scan the dynamic code of the web-based software application while the web-based software application is running;

performing a weighted comparison of the global element-event pairs with covered element-event pairs comprising global element-event pairs that can be tested by a set of initial compatibility tests; and generating a compatibility testing recommendation based at least in part on a result of the weighted comparison.

24. The computer program product of claim 23, wherein:
a first type of the result of the weighted comparison comprises a first determination that applying the set of initial compatibility tests to the web-based software application will test a subset of the global element-event pairs;
a second type of the result of the weighted comparison comprises a second determination that applying the set of initial compatibility tests to the web-based software application will test all of the global element-event pairs; and
a third type of the result of the weighted comparison comprises a third determination that a subset of the set of initial compatibility tests applied to the web-based software application will test all of the global element-event pairs.

25. The computer program product of claim 24, wherein:
the processor system operations further comprise identifying a redundancy among the covered element-event pairs;
the compatibility testing recommendation is:
based at least in part on the redundancy; and
generated using a machine learning algorithm; and
the weighted compatibility testing recommendation comprises a recommendation to remove the redundancy.

* * * * *